US011107084B2

(12) United States Patent
Karmakar et al.

(10) Patent No.: US 11,107,084 B2
(45) Date of Patent: Aug. 31, 2021

(54) FRAUD RISK SCORING TOOL

(71) Applicant: Walmart Apollo, LLC, Bentonville, AR (US)

(72) Inventors: Somedip Karmakar, Kolkata (IN); Ashish Gupta, Bangalore (IN); Bharadwaj Aldur Siddegowda, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 89 days.

(21) Appl. No.: 16/442,499

(22) Filed: Jun. 15, 2019

(65) Prior Publication Data

US 2020/0349575 A1 Nov. 5, 2020

(30) Foreign Application Priority Data

May 3, 2019 (IN) .............................. 201941017854

(51) Int. Cl.
*G06Q 20/40* (2012.01)
*G06F 17/15* (2006.01)
*G06N 20/00* (2019.01)

(52) U.S. Cl.
CPC ......... *G06Q 20/4016* (2013.01); *G06F 17/15* (2013.01); *G06N 20/00* (2019.01); *G06Q 20/407* (2013.01); *G06Q 20/4014* (2013.01)

(58) Field of Classification Search
CPC .............. G06Q 40/00; G06Q 30/0201; G06Q 20/4016; G06Q 30/0204; G06Q 20/40; G06Q 30/0255; G06Q 30/0269; G06Q 20/04; G06Q 20/10; G06Q 30/0207; G06Q 30/0261; G06Q 40/02; G06Q 40/08; G06Q 10/067; G06Q 10/10; G06Q 30/0185; G06Q 30/02; G06Q 30/0609; G06Q 40/025; G06Q 50/265; H04M 15/44; H04M 15/58; H04M 15/745; H04M 15/80; H04M 15/8011; H04M 15/8044; H04M 15/805;
(Continued)

(56) References Cited

U.S. PATENT DOCUMENTS 6,016,480 A 1/2000 Houovener et al.
8,065,233 B2 11/2011 Lee et al.
(Continued)

*Primary Examiner* — Alexander G Kalinowski
*Assistant Examiner* — Sanjeev Malhotra

(57) ABSTRACT

The disclosed fraud risk scoring tool provides data-driven identification of potential fraud cases. A fraud risk score is determined based at least on a weighted sum of multiple metrics, where weights are determined based on precision or inverse variance and suspension propensity importance, which is indicative of variable importance. An exemplary method includes: receiving and aggregating transaction metrics across customer IDs to produce an aggregated transaction metric data set; determining, for each aggregated transaction metric in the aggregated transaction metric data set, a precision value, a suspension propensity importance, and a scoring weight based at least on one of the precision value and the suspension propensity importance; determining, for each customer ID within the plurality of customer IDs, a risk score based at least on the scoring weights applied to corresponding transaction metrics and a risk priority; and reporting at least one customer ID associated with a selected risk priority.

16 Claims, 8 Drawing Sheets

COMMON RISK KPIs

- High Refund Amount/Frequency
- High Risky Cancellations
- High Refund Rate
- High Rate Of GNR Refunds
- High Refunds Through Web, Call Center Or Doorstep
- High Rate Of Repetition

302

SECONDARY RISK FACTORS

- High-Refunding Retail Facilities, Cities, Postcodes
- Refunds Made In High Value Items And In High Risk Stores

304

RISK SCORING

MULTI-PARTY COLLUSION

- Repeatedly Refunding With Same Driver With High Refund Amount
- Repeatedly Cancelling Orders By Same Employee After Pickup Completed

306

SUSPICIOUS BEHAVIOR

- Repeated Refunds Of Same Item
- Recent Spike In Refunds
- Doesn't Return Damaged Items Or Unwanted Substitutes
- Refunds At A Higher Price

308

(58) Field of Classification Search
CPC .. H04M 15/8083; H04M 15/83; H04M 15/84;
H04M 15/85; H04M 15/851; H04M
2215/0104; H04M 2215/0108; H04M
2215/018; H04M 2215/0184; H04M
2215/0188; H04M 2215/74; H04M
2215/7407; H04M 2215/745; H04M
2215/7457; H04M 2215/81; H04M
2215/8129; H04M 2215/815
USPC ... 705/7.28, 7.31, 7.33, 14.23, 14.42, 14.53,
705/26.35, 35, 38, 39, 318, 325, 7.29,
705/7.32, 14.52, 5, 14.66; 707/738
See application file for complete search history.

(56) References Cited

U.S. PATENT DOCUMENTS

| | | | |
|---|---|---|---|
| 8,504,456 B2 | 8/2013 | Griffin et al. | |
| 8,600,855 B2 | 12/2013 | Winters et al. | |
| 8,626,663 B2 | 1/2014 | Nightengale et al. | |
| 9,076,159 B2 | 7/2015 | Hammond et al. | |
| 9,600,779 B2 | 3/2017 | Hoover et al. | |
| 2008/0046334 A1* | 2/2008 | Lee | G06Q 20/4016 705/318 |
| 2008/0091512 A1* | 4/2008 | Marci | G06Q 30/0201 705/7.29 |
| 2010/0004977 A1* | 1/2010 | Marci | G06Q 30/0203 705/7.32 |
| 2010/0094767 A1* | 4/2010 | Miltonberger | G06Q 40/02 705/325 |
| 2010/0211439 A1* | 8/2010 | Marci | G06Q 10/10 705/7.29 |
| 2011/0071885 A1* | 3/2011 | Ayres de Castro | G06Q 30/02 705/7.31 |
| 2011/0153419 A1* | 6/2011 | Hall, III | G06Q 30/0254 705/14.52 |
| 2011/0282778 A1* | 11/2011 | Wright | G06Q 30/0609 705/38 |
| 2012/0089609 A1* | 4/2012 | Trovero | G06Q 30/0201 707/738 |
| 2012/0203580 A1* | 8/2012 | Smith | G06Q 40/12 705/5 |
| 2013/0080318 A1* | 3/2013 | Katz | G06Q 40/00 705/39 |
| 2013/0325608 A1* | 12/2013 | Kulkarni | H04M 15/58 705/14.53 |
| 2014/0180790 A1* | 6/2014 | Boal | G06Q 30/0211 705/14.42 |
| 2014/0310159 A1 | 10/2014 | Zoldi et al. | |
| 2014/0324537 A1* | 10/2014 | Gilbert | G06Q 30/0201 705/7.31 |
| 2014/0337171 A1* | 11/2014 | Sivashanmugam | G06Q 20/4016 705/26.35 |
| 2015/0026027 A1* | 1/2015 | Priess | G06Q 20/4016 705/35 |
| 2015/0170175 A1* | 6/2015 | Zhang | H04M 15/44 705/7.33 |
| 2015/0220951 A1* | 8/2015 | Kurapati | H04M 15/83 705/7.33 |
| 2015/0220999 A1* | 8/2015 | Thornton | H04M 15/8011 705/14.66 |
| 2015/0324715 A1* | 11/2015 | Nelson | G06Q 10/06 705/7.28 |
| 2015/0348083 A1* | 12/2015 | Brill | G06Q 20/386 705/14.23 |
| 2016/0086222 A1* | 3/2016 | Kurapati | G06Q 30/0261 705/14.53 |
| 2016/0162917 A1* | 6/2016 | Singh | G06Q 30/0204 705/7.33 |
| 2019/0333073 A1* | 10/2019 | Harris | G06Q 30/02 |

\* cited by examiner

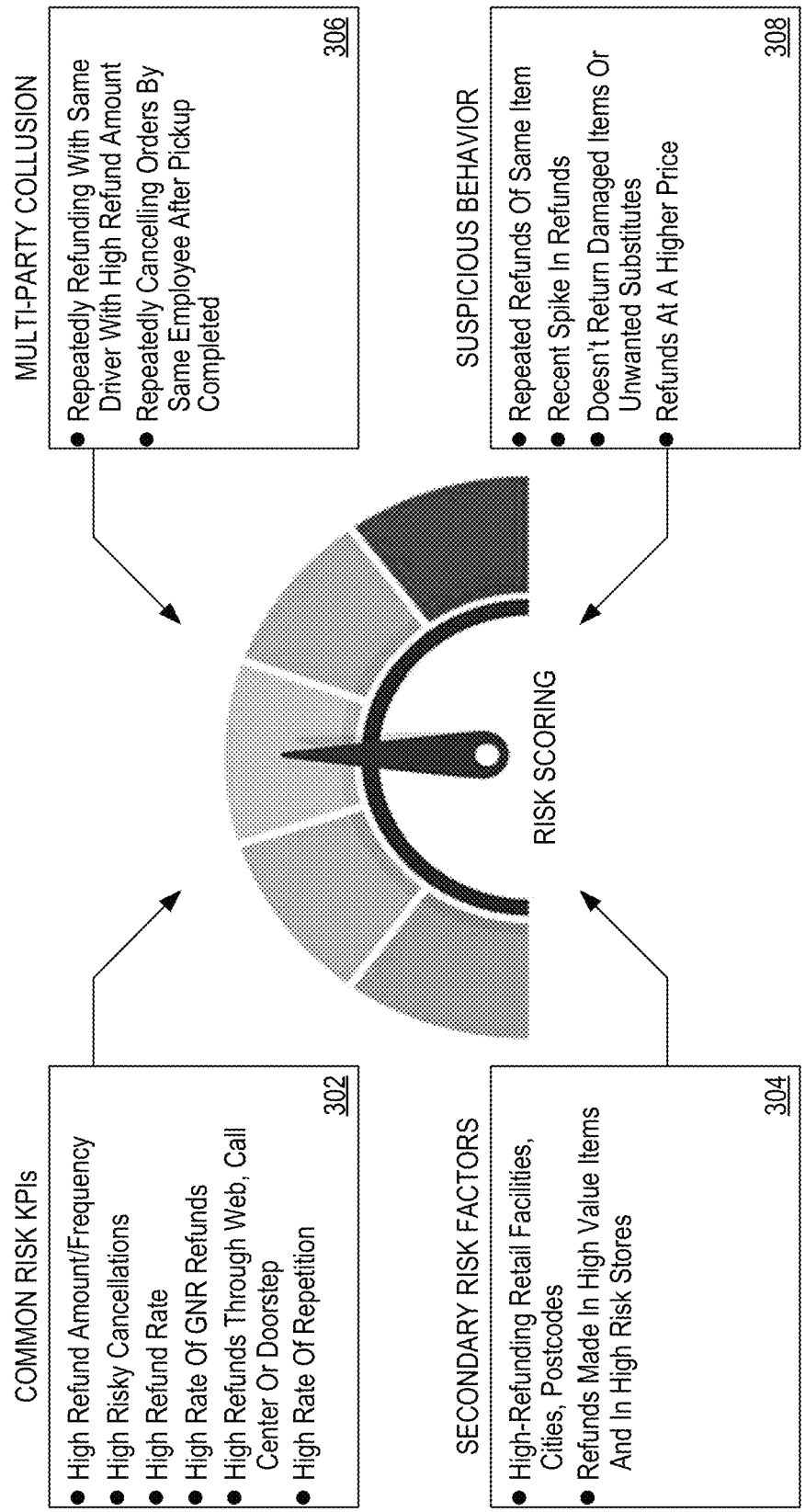

FRAUD RISK SCORING TOOL

BACKGROUND

In large-scale, complex e-commerce operations, it may be possible for fraud to occur and remain undetected, without proper analysis and investigation tools and resources. Various types of e-commerce fraud can occur, such as requesting a refund for items that were received intact while claiming the items had been lost or damaged, returning items purchased at a discount while demanding a refund on the higher list price, and other examples. In some scenarios, thoroughly investigating every refund or return transaction can become prohibitively burdensome. In some scenarios, fraudulent activity is carefully scripted to "fly under the radar" an avoid triggering detection based on a single type of activity. Therefore, data analytics tools are needed that can identify indications of fraudulent transactions using a plurality of indicators.

SUMMARY

A disclosed fraud risk scoring tool for e-commerce applications provides a data-driven method to identify potential fraud cases and comprises: a processor; and a computer-readable medium storing instructions that are operative when executed by the processor to: receive transaction metrics indexed with one of a plurality of customer IDs; aggregate the transaction metrics across the customer IDs to produce an aggregated transaction metric data set; determine, for each aggregated transaction metric in the aggregated transaction metric data set, a precision value; determine, for each aggregated transaction metric in the aggregated transaction metric data set, a suspension propensity importance; determine, for each aggregated transaction metric in the aggregated transaction metric data set, a scoring weight based at least on one of the precision value and the suspension propensity importance; determine, for each customer ID within the plurality of customer IDs, a risk score based at least on the scoring weights applied to corresponding transaction metrics; determine, based at least on the risk score for each customer ID within the plurality of customer IDs, a risk priority; and report, for a selected risk priority, at least one customer ID associated with the selected risk priority.

BRIEF DESCRIPTION OF THE DRAWINGS

The disclosed examples are described in detail below with reference to the accompanying drawing figures listed below:

FIG. 3 illustrates various fraud risk factors used by the fraud risk scoring tool of FIG. 7;

Figure 1:
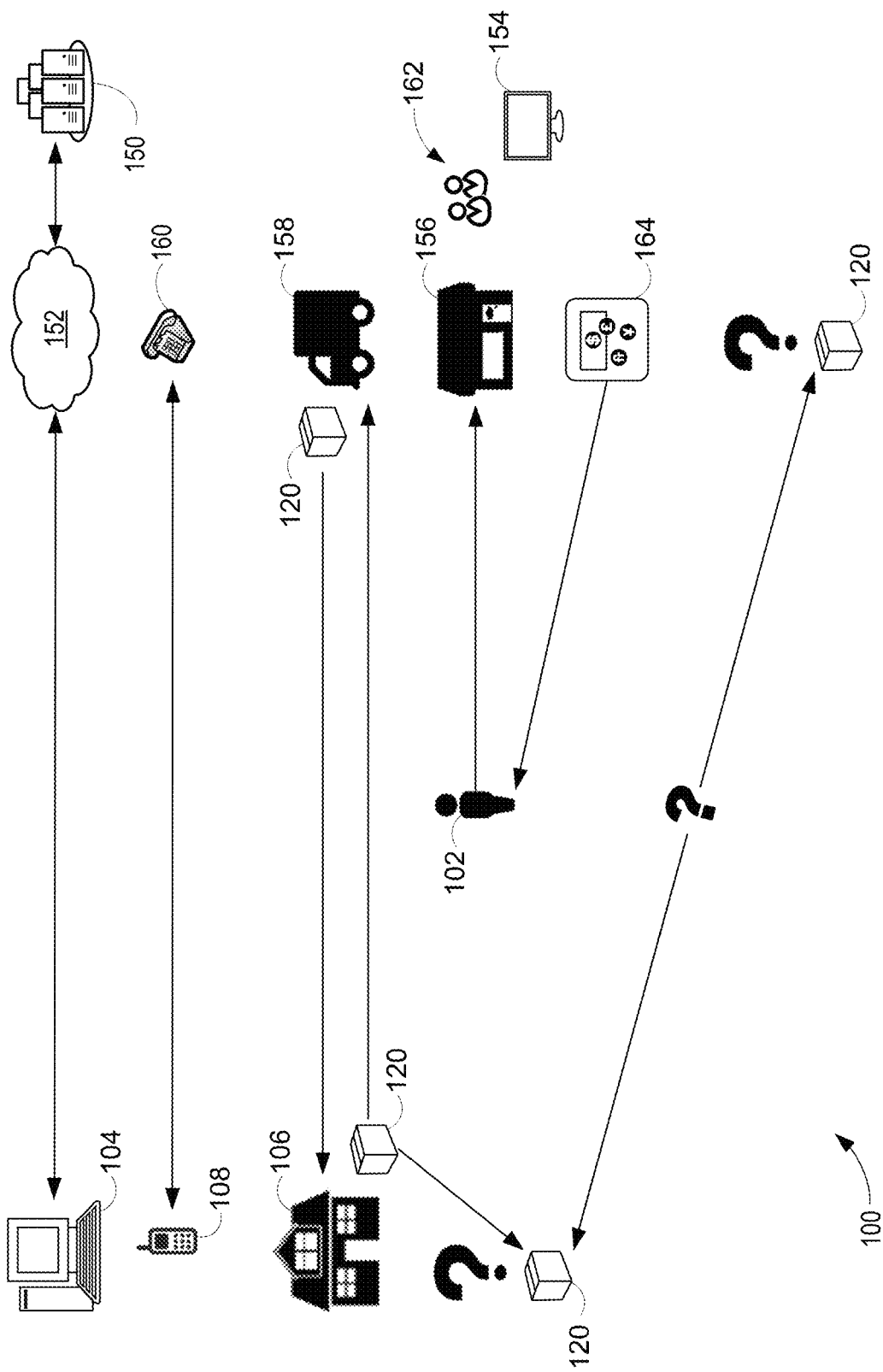
FIG. 1 illustrates an exemplary environment that can advantageously employ an fraud risk scoring tool for e-commerce applications.

Corresponding reference characters indicate corresponding parts throughout the drawings. Elements in the figures are illustrated for simplicity and clarity and have not necessarily been drawn to scale. For example, the dimensions and/or relative positioning of some of the elements in the figures may be exaggerated relative to other elements to help to improve understanding. Also, common but well-understood elements that are useful or necessary in a commercially feasible embodiment may not be depicted, in order to facilitate a less obstructed view.

DETAILED DESCRIPTION

A more detailed understanding may be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that may in isolation and out of context be read as absolute and therefore limiting, may only properly be read as being constructively preceded by a clause such as "In at least some embodiments, . . . " For brevity and clarity, this implied leading clause is not repeated ad nauseum.

In large-scale, complex e-commerce operations, it may be possible for fraud to occur and remain undetected, without proper analysis and investigation tools and resources. Various types of e-commerce fraud can occur, such as requesting a refund for items that were received intact while claiming the items had been lost or damaged, returning items purchased at a discount while demanding a refund on the higher list price, and other examples. In some scenarios, thoroughly investigating every refund or return transaction can become prohibitively burdensome. In some scenarios, fraudulent activity is carefully scripted to "fly under the radar" an avoid triggering detection based on a single type of activity. Therefore, data analytics tools are needed that can identify indications of fraudulent transactions using a plurality of indicators.

Therefore, a disclosed fraud risk scoring tool provides for data-driven identification of potential fraud cases. A fraud risk score is determined based at least on a weighted sum of multiple metrics, where weights are determined based on precision or inverse variance and suspension propensity importance, which is indicative of variable importance. An exemplary method of determining fraud risk scores includes: receiving transaction metrics indexed with one of a plurality of customer IDs; aggregating the transaction metrics across the customer IDs to produce an aggregated transaction metric data set; determining, for each aggregated transaction metric in the aggregated transaction metric data set, a precision value; determining, for each aggregated transaction metric in the aggregated transaction metric data set, a suspension propensity importance; determining, for each aggregated transaction metric in the aggregated transaction metric data set, a scoring weight based at least on one of the precision value and the suspension propensity importance; determining, for each customer ID within the plurality of customer IDs, a risk score based at least on the scoring weights applied to corresponding transaction metrics; determining, based at least on the risk score for each customer ID within the plurality of customer IDs, a risk priority; and reporting, for a selected risk priority, at least one customer ID associated with the selected risk priority.

FIG. 1 illustrates an exemplary environment 100 that can advantageously employ fraud risk scoring. A customer 102 orders some items in an e-commerce sales transaction, for example by using a computer 104 visiting an online sales site 150 (e.g., a website) over the internet 152, or using an in-store terminal 154 in a retail facility 156. In some situations, a delivery vehicle 158 delivers goods 120 (at least some of the ordered items) to customer location 106 (e.g., a residence or office). Each of delivery vehicle 158, online sales site 150, and in-store terminal 154 acts as a sales transaction node, because each can take part in a sales transaction and/or be a source of information. For example, delivery vehicle 158 (or equipment thereon) may collect an electronic record of deliveries and retrievals. Alternatively, customer 102 can elect to forego delivery to customer location 106 and pick up goods 120 at retail facility 156.

Customer 102 then demands a refund for goods 120. This may occur in one of multiple ways. Customer 102 can use computer 104 to visit online sales site 150 or call in to call center 160 with telephone 108. In some cases, customer can refuse delivery when delivery vehicle 158 arrives to deliver goods 120, or even schedule delivery vehicle 158 to retrieve goods 120 that had been delivered earlier. For in-store pickups, customer 102 can cancel the order, for example with the assistance of sales representatives 162 who may enter the cancellation into in-store terminal 154. In some situations, orders are canceled prior to pickup of goods 120. However, in other situations, an order is not canceled until after pickup of goods 120. Each of delivery vehicle 158, online sales site 150, and in-store terminal 154 acts as a refund transaction node, because each can take part in a refund transaction and/or be a source of information.

Customer 102 then receives a refund 164. However, there is a possibility that refund 164 is part a fraudulent transaction. For example, if goods 120 were not returned (e.g., customer 102 claims goods 120 had not been delivered or were damaged and discarded), but yet customer does possess goods 120 in good condition, then refund 164 is unwarranted. Alternatively, refund 164 may be more than customer 102 had paid. In some cases, items returned may be counterfeit, such as if customer had purchased lower quality items elsewhere and represented them as goods 120. A refund analysis can identify anomalous transactions and high-risk transactions, such as high refund request amounts or frequency, demanding a refund without returning goods, and cancelling orders after item pickup. However, in some situations, customer 102 engages in fraudulent activity in a manner intended to avoid detection, for example, spreading fraudulent refunds among different specific activities. This can reduce the likelihood that any single indicator will result in a risk flag.

Figure 2A:
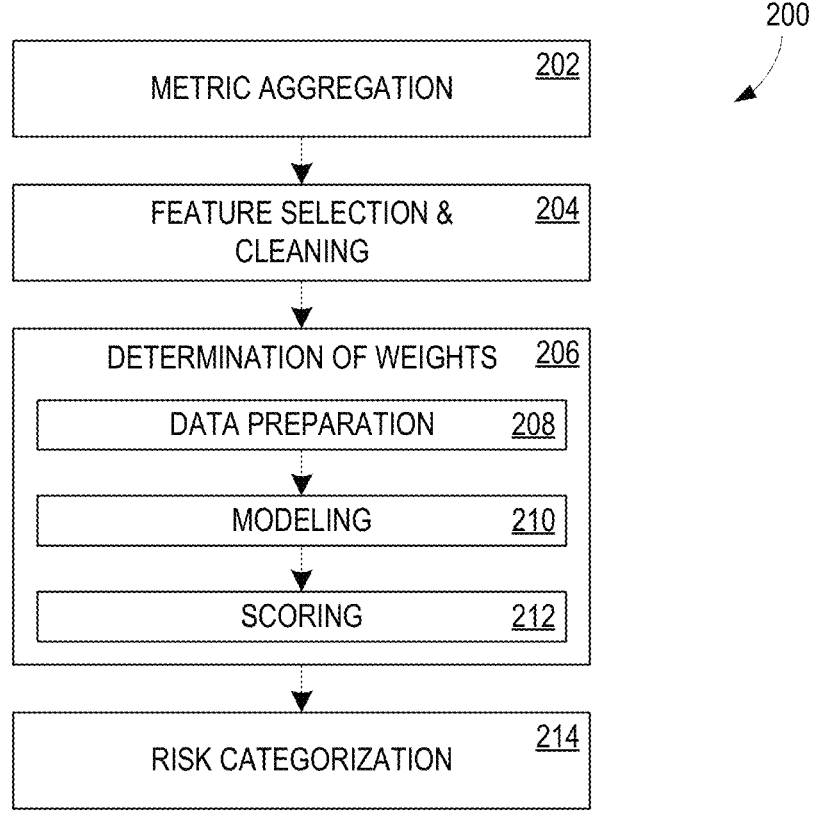
FIG. 2A illustrates an exemplary high level process flow for fraud risk scoring.

FIG. 2A illustrates an exemplary high level process flow 200 for fraud risk scoring. Aggregation of transaction metrics occurs during operation 202. Some various transaction metrics are illustrated in FIG. 3, and include:
  high refund amount and/or frequency;
  high risky cancellations;
  high refund rate; high rate of goods not returned (GNR) refunds;
  high refunds through web, call center or doorstep;
  high rate of repetition;
  high-refunding retail facilities, cities, postal codes;
  refunds made in high value items and in high risk retail facilities;
  repeatedly refunding with the same driver with a high refund amount;
  repeatedly cancelling orders by the same sales representative after pickup completed;
  repeated refunds of same item;
  a spike in refunds;
  refunds at a higher price than paid;
  claims of damaged goods;
  claims of lost or undelivered goods; and
  others.

Transaction metrics are aggregated at the customer level and then across the customer base. For example, all transactions for a particular customer ID are aggregated to identify all transactions and amounts associated with each customer ID. Customer identifying information is anonymized or pseudonymized for privacy purposes, and the customer ID is used in place of any names, to protect customers' privacy. A customer ID may be a randomized, unique identifier generated in association with a customer profile to identify transaction records associated with that profile without using any personal identifying information. Feature selection and cleaning occurs in operation 204, for example, to remove highly correlated variables (thereby reducing multi-collinearity). That is, at least a portion of aggregated transaction metrics having a correlation exceeding a correlation threshold are removed from the aggregated transaction metric data set. The transaction metrics are normalized so that a typical customer baseline can be determined.

Weights for the transaction metrics are determined in operation 206, which has multiple phases. Weights are based at least on one of a precision value and a suspension propensity importance. Precision is the inverse of variance. If one transaction metric is fairly constant across most customers (e.g., that metric has a low variance), then that transaction metric is generally given more weight, so that outliers for that transaction metric are more likely to be flagged. Feedback (e.g., historical data) from prior investigations that includes whether certain activities resulted in suspension of transactions due to a fraud finding is used for determining suspension propensity importance for each transaction metric. Within operation 206, data preparation occurs in phase 208. For example, data is split into training, validation, and test data sets as part of machine learning (ML) component training. Modeling occurs in phase 210, for example using an ML component. In some examples, XgBoost model training is used. XgBoost is an ensemble learning method that is used when reliance upon a single ML model is likely to be insufficient. Ensemble learning offers a systematic solution to combine the predictive power of multiple ML models, and which gives the aggregated output from several ML models. In some examples, a manual setting is used for a starting point, and the ML component learns the weighting based at least on a feedback loop from investigation results into potentially risky transactions. In some examples, the ML model is trained to maximize a parameter of a precision-recall data set, for example the area under a precision-recall curve.

In phase 212, weights are used for scoring. Ideally, no single transaction metric will bias the results, and fraud can be detected, even of the fraud would escape detection when using only single transaction metrics in isolation. For example, a particular customer ID may be associated with multiple different risky transactions, but at a level that is below the risk trigger threshold for each transaction metric, individually. However, by being near the threshold for multiple transaction metrics simultaneously, the customer ID may then be flagged for investigation. The fraud risk score is based at least on transaction data that includes refund and cancellation data. Additional data is included based on the transaction metrics available, such as a spike in refunds, price arbitrage, substitution fraud, repeated refund of the same items, and others. In some examples, the fraud risk score is calculated as a weighted sum of multiple transaction metrics. This permits determination of a priority order of transactions for investigation (e.g., by ranking fraud risk scores).

Figure 6A:
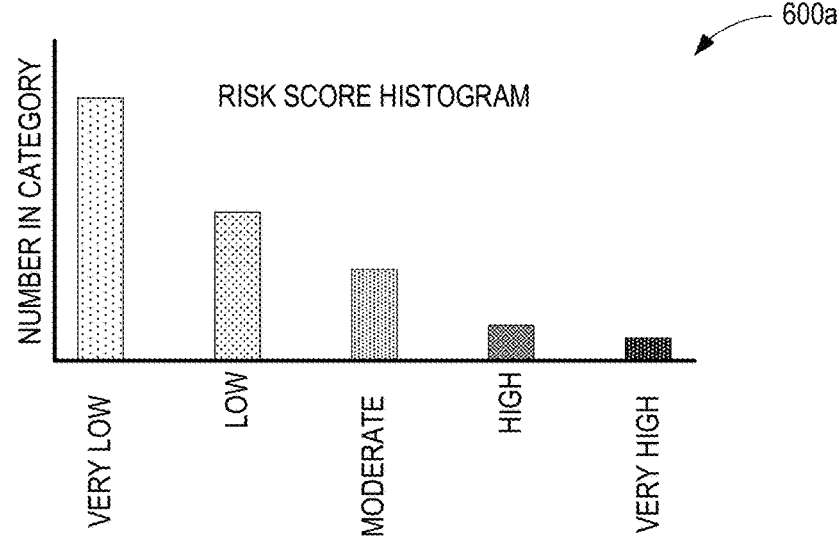
FIG. 6A illustrates an exemplary graphical representation of a fraud risk score summary.
Figure 6B:
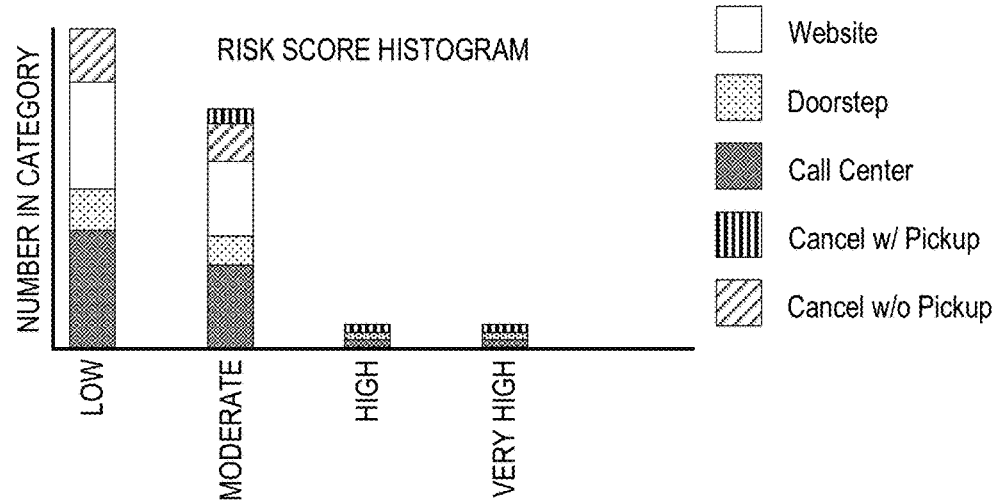
FIG. 6B illustrates an additional exemplary graphical representation of a fraud risk score summary.

Risks are categorized into risk priorities in operation 214, and reasons (e.g., significantly contributing factors) for the risk scores are provided. Risk scores are binned into risk categories. In some examples, determining risk priority involves assigning each customer ID to one of a predetermined set of risk categories. Examples of risk categories are shown in FIGS. 6A and 6B. This enables proactive responses for risky transactions. Providing the reasons for the risk scores facilitates remedial measures. Example reasons include:

refund for high value items, claimed items were damaged, GNR;
high rate of refunds through driver, high risk postal code, GNR;
cancellation after pickup, high risk sales representative;
high rate of refunds through driver, high rate of refunds at retail facility;
unwanted substitutes, GNR; and
others.

Figure 2B:
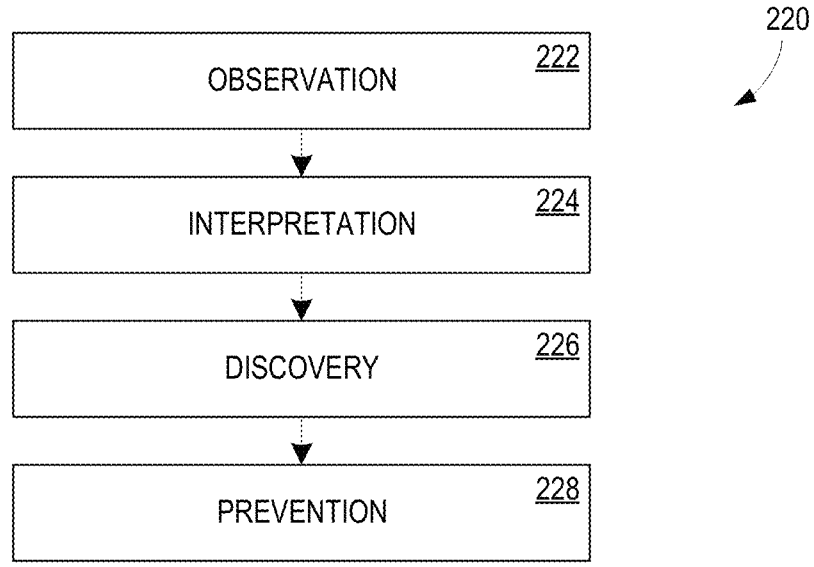
FIG. 2B illustrates another exemplary high level process flow for fraud risk scoring.

FIG. 2B illustrates an exemplary high level process flow 220 for fraud risk scoring. High level process flow 220 provides another perspective of the overarching functions of fraud risk scoring. Operation 222 includes observation of transaction metrics to identify potential fraud detection options. Operation 224 seeks to interpret the observations to generate the risk scores and reasons. Operation 226 includes discovery of new and better detections, such as by ongoing ML training. Operation 228 is prevention of new fraud attempts, for example by suspending risky transactions until remedial actions can be taken to ensure that the transactions are legitimate.

Figure 7:
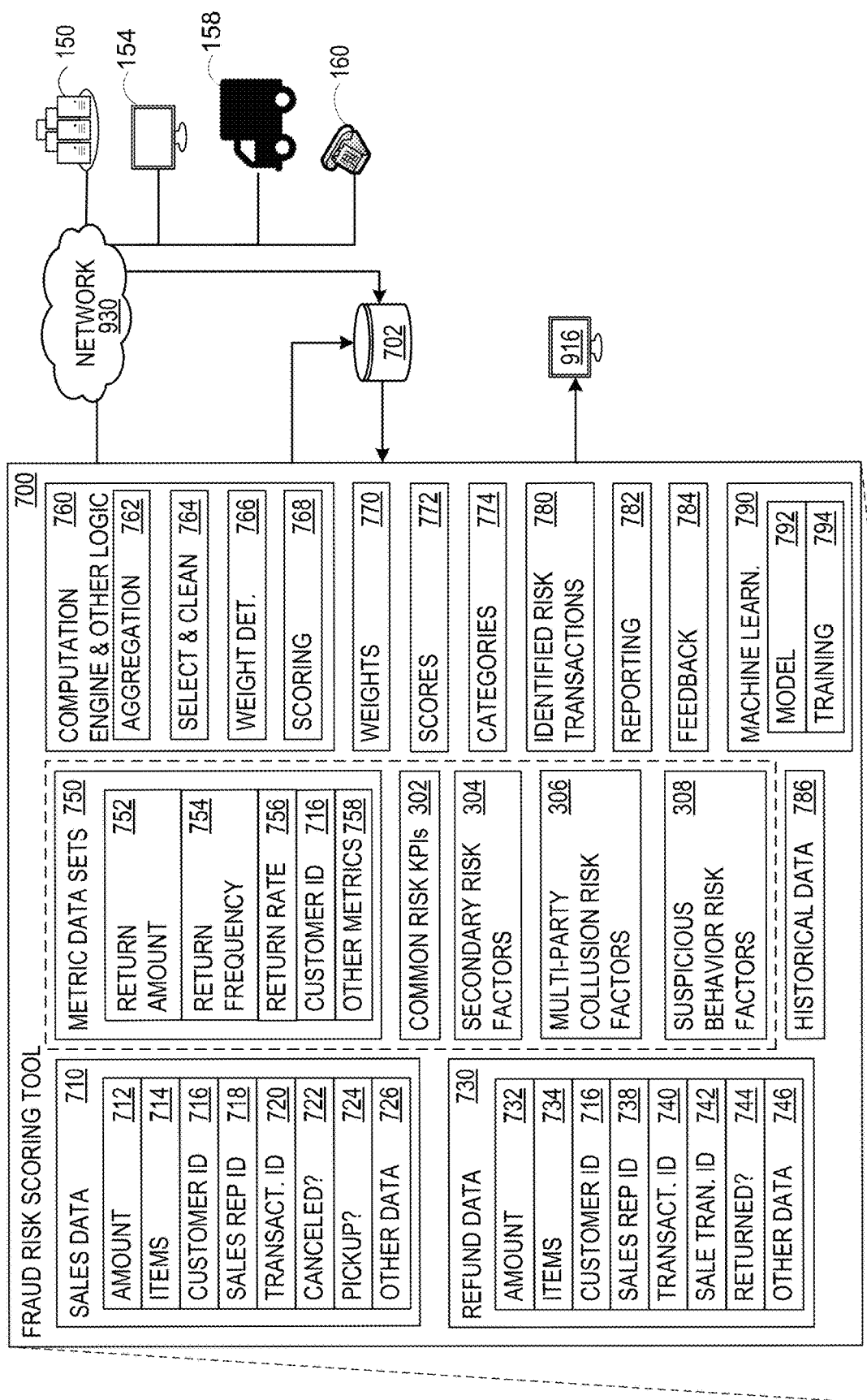
FIG. 7 is a block diagram of an exemplary fraud risk scoring tool.

FIG. 3 illustrates various fraud risk factors used by a fraud risk scoring tool 700, which is described in more detail in relation to FIG. 7, and operates in accordance with process flows 200 and 220. As indicated in FIG. 3, the various transaction metrics include metrics based on common risk key performance indicators (KPIs) 301, secondary risk factors 304, multi-party-collusion risk factors 306, and other suspicious behaviors 308. Common risk KPIs 302 include high refund amount and/or frequency; high risky cancellations; high refund rate; high rate of GNR refunds; high refunds through web, call center or doorstep (via driver); and high rate of repetition. Secondary risk factors 304 include high-refunding retail facilities, cities, postal code; and refunds made in high value items and in high risk retail facilities. Multi-party collusion risk factors 306 (e.g., when a sales representative or delivery driver colludes with a customer) includes repeatedly refunding with the same driver with a high refund amount; and repeatedly cancelling orders by the same sales representative after pickup completed. Other suspicious behaviors 308 include repeated refunds of the same item; a spike in refunds; refunds at a higher price than what was paid; claims of damaged goods; and claims of lost or undelivered goods.

Figure 4:
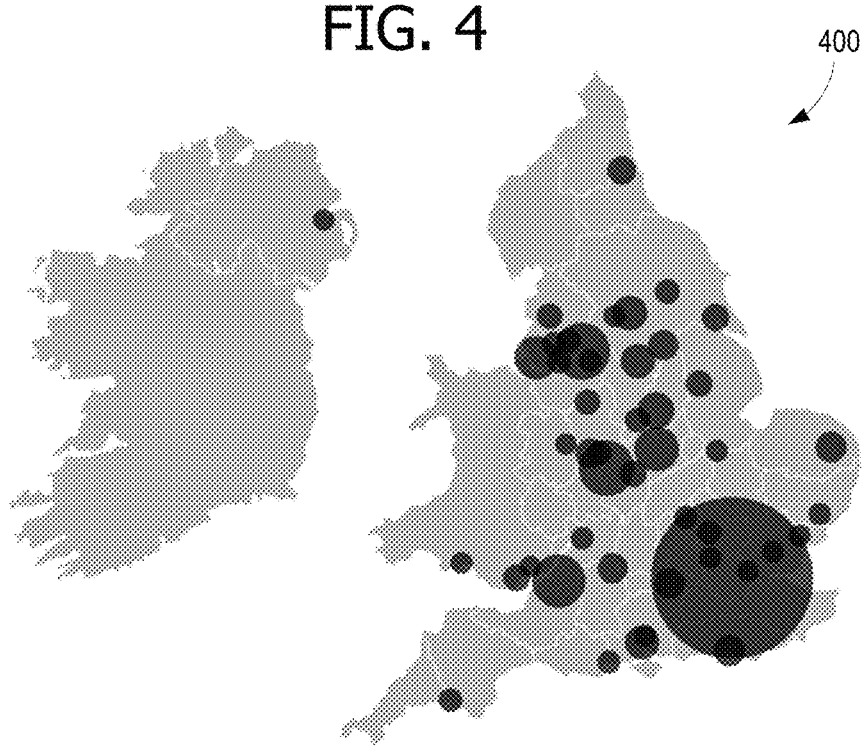
FIG. 4 illustrates an exemplary graphical representation of data relevant to a fraud risk factor.

FIG. 4 illustrates a display of transaction location information as a map 400. In some examples, the location of a transaction is a secondary risk factor 304 in determination of a risk score. Map 400 illustrates risks or certain risk metrics as circles, centered at the location of a particular retail facility or a representative regional reference point, with the diameter of each circle proportionate to the value of the metric. Metrics that can be displayed for the particular facility this way, by the fraud risk scoring tool 700, include values of sales, returns, and cancellations; item counts for sales, returns, and cancellations; rates of sales, returns, and cancellations; frequencies of returns and cancellations; and other metrics. In some examples, the circles can represent multiple values simultaneously, one by circle diameter, and another by shading intensity.

Figure 5:
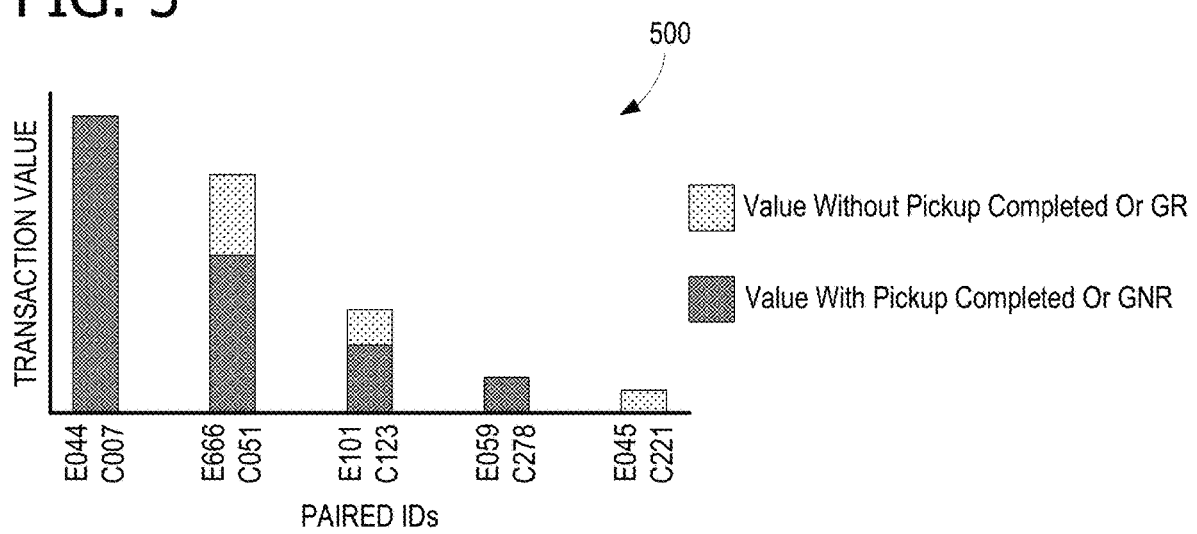
FIG. 5 illustrates an exemplary graphical representation of additional data relevant to a fraud risk factor.

FIG. 5 illustrates an exemplary graphical representation of data relevant to a fraud risk factor in a bar graph 500, specifically multi-party potential collusion. Correlating the customer IDs and sales representative IDs permits identification of potential collusion. In some examples, the pairing of a particular customer and a sales representative associated with a transaction is a secondary risk factor in determination of a risk threshold. Thus, FIG. 5 illustrates transaction data for refund and canceled transactions, indexed with paired sets of sales representative IDs and customer IDs. This enables identification of customers having an "inside contact" who assists with fraudulent transactions. In some examples, collusions can also be detected by location, when a particular sales representative, who colludes with one or more customers, remains predominantly at a single retail facility. As illustrated, the data may be further illustrated according to whether there was a cancellation without pickup completed or a refund with the goods returned (GR), versus a cancellation with pickup completed or a refund with the goods not returned (GNR).

FIG. 6A illustrates an exemplary graphical representation of a fraud risk score summary in a histogram bar graph 600a. Bar graph 600a shows five categories, which is a practical upper limit, in some examples. The illustrated categories are very low, low, moderate, high, and very high. FIG. 6B illustrates an additional exemplary graphical representation of a fraud risk score summary in a histogram bar graph 600b. The illustrated categories are low, moderate, high, and very high. It should be understood that the number of risk categories can vary according to operational needs. Bar graph 600b also provides further information regarding aggregated transaction metric data in each risk category. For example, refund transactions are indicated as refunds requested via online sales site 150, doorstep (e.g., delivery vehicle 158), and call center 160. In some examples, whether goods had been returned is also indicated. Canceled transactions are indicated according to whether pickup had been completed.

FIG. 7 shows a fraud risk scoring tool 700 that can perform operations described herein to detect fraudulent transactions for e-commerce transactions. In some examples, the operations described herein for fraud risk scoring tool 700 are performed as computer-executable instructions on one or more computing nodes 900 (which is described in more detail in relation to FIG. 9), using the data sets described herein, that are stored on one or more computing nodes 900.

Fraud risk scoring tool 700 connects to online sales site 150, in-store terminal 154, delivery vehicle 158, and call center 160 over network 930 (collectively, transaction nodes) to receive and store sales data 710 and refund data 730 locally and/or in a data store 702. Sales data 710 is indexed with one of a plurality of customer IDs 716 and also includes amounts 712, item lists 714 (e.g., items sold), sales representative IDs 718, transaction IDs 720, cancellation flags 722 (indicating whether an order was canceled), pickup flags 724 (indicating whether goods for an order were picked up), and other data 726, such as a retail facility ID, and other information. Refund data 730 is also indexed with one of the plurality of customer IDs 716, and has similar information: Amounts 732, item lists 734 (e.g., items refunded), sales representative IDs 738, transaction IDs 740, links 742 to the corresponding transaction IDs 720 in sales data 710, return flags 744 (indicating whether the goods were returned), and other data 746, such as a retail facility ID, and other information.

A computation engine 760 performs computations described herein, such as determining, based at least on sales data 710 and refund data 730, a plurality of aggregated transaction metric data sets 750 indexed with one of the plurality of customer IDs 716, wherein plurality of aggregated transaction metric data sets 750 includes at least a return amount data set 752, a return frequency data set 754, and a return rate data set 756. Return amount data set 752 is derived from amounts 732 in refund data 730. Return frequency data set 754 leverages historical data 786 that stores information so that return histories can be ascertained by customer IDs 716. Return rate data set 756 is derived using amounts 712 in sales data 710 and amounts 732 in refund data 730, to reflect the rate at which purchases that are refunded. Other metrics 758 are also used.

Common risk KPIs 302, secondary risk factors 304, multi-party-collusion risk factors 306, and other suspicious behaviors 308, described above in relation to FIGS. 2A-3, are included within aggregated transaction metric data sets 750, and are thus sets of aggregated transaction metrics. Common risk KPIs include refund transaction data and cancellation transaction data. Secondary risk factors 304 can include additional risk metric data, such as for identifying retail facilities and sales representatives associated with higher (and potentially anomalous) refund activity.

Computation engine 760 uses an aggregation component 762 to aggregate transaction metrics across the customer IDs 716 to produce aggregated transaction metric data sets 750. Computation engine 760 then uses a selection and cleaning component 764 to select and clean aggregated transaction metric data sets 750, for example to remove at least a portion of aggregated transaction metrics having a correlation exceeding a correlation threshold. In support of this operation selection and cleaning component 764 determines a precision value and a suspension propensity importance for each aggregated transaction metric in aggregated transaction metric data sets 750. Suspension propensity importance can be determined using transaction feedback data 784 that indicates transactions and/or customer IDs that had been suspended, along with the risk factors that led to the suspensions. Computation engine 760 uses a weight determination component 766 to determine, for each aggregated transaction metric in aggregated transaction metric data sets 750, a scoring weight 770 based at least on one of the precision value and the suspension propensity importance. Some examples of weight determination component 766 use an ML model 792, as described above.

A scoring component 768 determines, for each customer ID within plurality of customer IDs 716, a risk score 772 based at least on the scoring weights 770 applied to corresponding transaction metrics (in aggregated transaction metric data sets 750) and also determines, based at least on risk scores 772 for each customer ID within plurality of customer IDs 716, a risk priority. Risk priorities are then binned into one of a plurality of risk categories 774. Based on the criteria selected, identified risk transactions 780 are reported, for a selected risk priority. The reported data includes at least one customer ID associated with the selected risk priority. Identified risk transactions 780 are stored and reported, for example using presentation components 916 (e.g., a computer monitor screen) or another outgoing message. In some examples, reporting a risk transaction includes writing a file to memory for later retrieval. In some examples, reporting a risk transaction includes sending an electronic message. In some examples, reporting a risk transaction includes reporting the customer ID as a risk customer.

Upon an investigation (triggered by the reporting) the finding may be that the risk transactions included fraud (and so should be or should have been suspended), or else were legitimate and suspension is not warranted. This information is saved in transaction feedback data 784. ML component 790 then uses ML training component 794 on transaction feedback data 784 to train Ml model 792, for example, as described above in relation to FIG. 2A.

Figure 8:
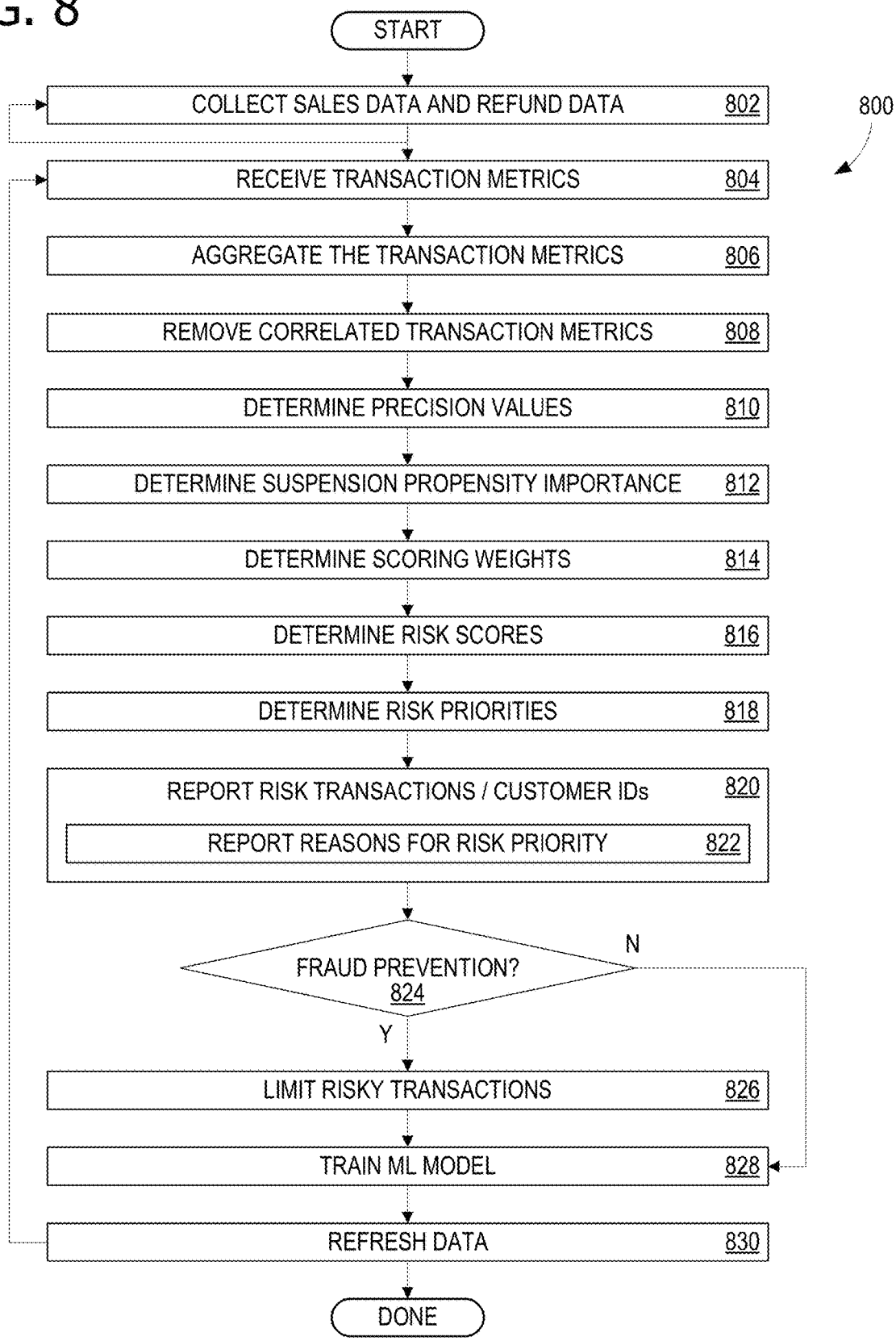
FIG. 8 shows a flow chart of operations associated with the fraud risk scoring tool of FIG. 7.

FIG. 8 shows a flow chart 800 of operations associated with fraud risk scoring tool 700. In some examples, some or all of flow chart 800 is performed as computer-executable instructions on a computing node 900 (see FIG. 9). Flow chart 800 commences with operation 802, which includes collecting sales data and refund data into a data store. Operation 802 is ongoing, as transactions occur. Operation 804 includes receiving transaction metrics indexed with one of a plurality of customer IDs. In some examples, the transaction metrics comprise refund transaction data and cancellation transaction data. Operation 806 includes aggregating the transaction metrics across the customer IDs to produce an aggregated transaction metric data set. Operation 808 includes removing, from the aggregated transaction metric data set, at least a portion of aggregated transaction metrics having a correlation exceeding a correlation threshold. Operation 810 includes determining, for each aggregated transaction metric in the aggregated transaction metric data set, a precision value, and operation 812 includes determining, for each aggregated transaction metric in the aggregated transaction metric data set, a suspension propensity importance. In some examples, operation 808 follows operations 810 and 812, and in some examples, operation 808 is integrated into operations 810 and 812.

With the aggregated transaction metrics thus normalized and cleaned, operation 814 includes determining, for each aggregated transaction metric in the aggregated transaction metric data set, a scoring weight based at least on one of the precision value and the suspension propensity importance. In some examples, determining the scoring weight comprises determining, using the ML model, the scoring weight. The scoring weights are based on only aggregated data. Operation 816 includes determining, for each customer ID within the plurality of customer IDs, a risk score based at least on the scoring weights applied to corresponding transaction metrics. Although customer IDs are associated with scores, because they are associated with the transactions that are scored, the scoring does not use customer ID. Rather, it is the aspects of the transactions that are used to calculate the scores. Operation 818 includes determining, based at least on the risk score for each customer ID within the plurality of customer IDs, a risk priority. In some examples, determining the risk priority comprises assigning each customer ID to one of a predetermined set of risk categories. In some examples, the predetermined set of risk categories has no more than five categories.

Operation 820 includes reporting, for a selected risk priority, at least one customer ID associated with the selected risk priority. In some examples, operation 820 further includes operation 822 for reporting at least one customer ID associated with the selected risk priority further comprises reporting reasons for the selected risk priority associated with the reported customer ID. If fraud risk scoring tool 700 is to be used for proactive fraud prevention, according to decision operation 824, the operation 826 includes limiting, based at least on a risk priority associated with a selected customer IDs, a transaction. Operation 828 then includes training an ML model on transaction feedback. In some examples, training the ML model on transaction feedback comprises splitting data into training, validation, and test data sets; and training the ML model to maximize a parameter of a precision-recall data set.

Flow chart 800 should be run for continual fraud monitoring when transactions are ongoing in operation 802. Therefore, operation 830 refreshes the metric data and repeats the foregoing, by returning to operation 804, for example weekly, or another time period, or based on events (e.g., holiday transaction surges). The metrics will contain time dependencies, so risk thresholds will be set according to the time period included within the metric data. For example, the risk threshold for the return amount metric will be different when time period included is a week versus two weeks.

Exemplary Operating Environment

Figure 9:
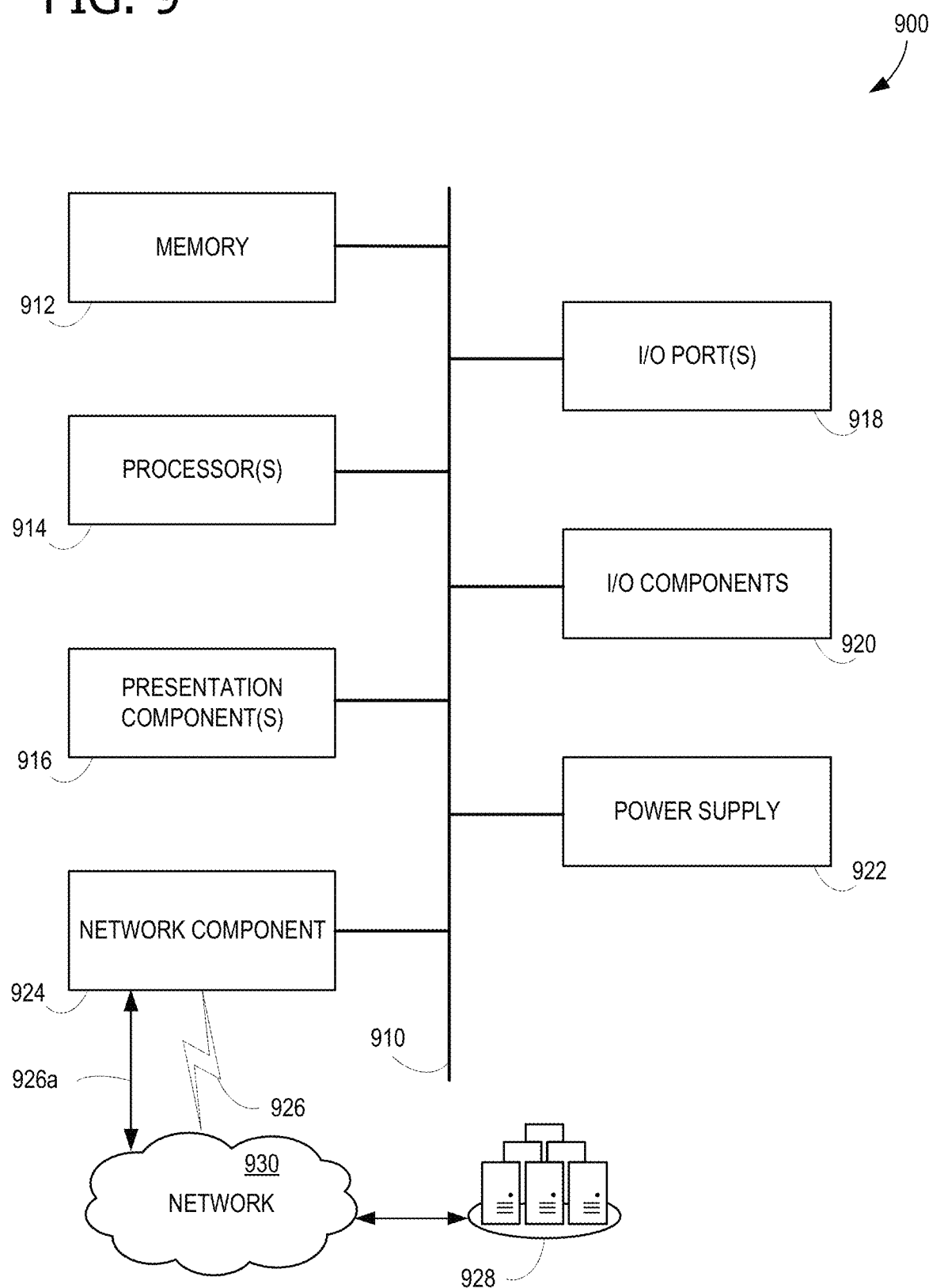
FIG. 9 is a block diagram of an example computing node for implementing aspects disclosed herein.

FIG. 9 is a block diagram of an example computing node 900 for implementing aspects disclosed herein and is designated generally as computing node 900. Computing node 900 is one example of a suitable computing environment and is not intended to suggest any limitation as to the scope of use or functionality of the invention. Neither should the computing node 900 be interpreted as having any dependency or requirement relating to any one or combination of components/modules illustrated. The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing nodes, etc. The disclosed examples may also be practiced in distributed computing environments, where tasks are performed by remote-processing devices that are linked through communications network 930.

Computing node 900 includes a bus 910 that directly or indirectly couples the following devices: memory 912, one or more processors 914, one or more presentation components 916, input/output (I/O) ports 918, I/O components 920, a power supply 922, and a network component 924. Computing node 900 should not be interpreted as having any dependency or requirement related to any single component or combination of components illustrated therein. While computing node 900 is depicted as a seemingly single device, multiple computing nodes 900 may work together and share the depicted device resources. That is, one or more computer storage devices having computer-executable instructions stored thereon may perform operations disclosed herein. For example, memory 912 may be distributed across multiple devices, processor(s) 914 may provide housed on different devices, and so on.

Bus 910 represents what may be one or more busses (such as an address bus, data bus, or a combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and the diagram of FIG. 9 is merely illustrative of an exemplary computing node that can be used in connection with one or more embodiments. Distinction is not made between such categories as "workstation," "server," "laptop," "hand-held device," etc., as all are contemplated within the scope of FIG. 9 and the references herein to a "computing node" or a "computing device." Memory 912 may include any of the computer-readable media discussed herein. Memory 912 may be used to store and access instructions configured to carry out the various operations disclosed herein. In some examples, memory 912 includes computer storage media in the form of volatile and/or nonvolatile memory, removable or non-removable memory, data disks in virtual environments, or a combination thereof.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing node 900, or by a processor external to the client computing node 900. In some examples, the processor(s) 914 are programmed to execute instructions such as those illustrated in the flowcharts discussed below and depicted in the accompanying drawings. Moreover, in some examples, the processor(s) 914 represent an implementation of analog techniques to perform the operations described herein. For example, the operations may be performed by an analog client computing node 900 and/or a digital client computing node 900.

Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly among multiple computing nodes 900, across a wired connection, or in other ways. Ports 918 allow computing node 900 to be logically coupled to other devices including I/O components 920, some of which may be built in. Example I/O components 920 include, for example but without limitation, a microphone, keyboard, mouse, joystick, game pad, satellite dish, scanner, printer, wireless device, etc.

In some examples, the network component 924 includes a network interface card and/or computer-executable instructions (e.g., a driver) for operating the network interface card. Communication between the computing node 900 and other devices may occur using any protocol or mechanism over any wired or wireless connection. In some examples, the network component 924 is operable to communicate data over public, private, or hybrid (public and private) network 930 using a transfer protocol, between devices wirelessly using short range communication technologies (e.g., near-field communication (NFC), Bluetooth® branded communications, or the like), or a combination thereof. Network component 924 communicates over wireless communication link 926 and/or a wired communication link 926*a* to a cloud resource 928 across network 930. Various different examples of communication links 926 and 926*a* include a wireless connection, a wired connection, and/or a dedicated link, and in some examples, at least a portion is routed through the internet.

Although described in connection with an example computing node 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing nodes, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device or computing node when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Exemplary Operating Methods and Systems

An exemplary system for determining fraud risk scores comprises: a processor; and a computer-readable medium storing instructions that are operative when executed by the processor to: receive transaction metrics indexed with one of a plurality of customer IDs; aggregate the transaction metrics across the customer IDs to produce an aggregated transaction metric data set; determine, for each aggregated transaction metric in the aggregated transaction metric data set, a precision value; determine, for each aggregated transaction metric in the aggregated transaction metric data set, a suspension propensity importance; determine, for each aggregated transaction metric in the aggregated transaction metric data set, a scoring weight based at least on one of the precision value and the suspension propensity importance; determine, for each customer ID within the plurality of customer IDs, a risk score based at least on the scoring weights applied to corresponding transaction metrics; determine, based at least on the risk score for each customer ID within the plurality of customer IDs, a risk priority; and report, for a selected risk priority, at least one customer ID associated with the selected risk priority.

An exemplary method of determining fraud risk scores comprises: receiving transaction metrics indexed with one of a plurality of customer IDs; aggregating the transaction metrics across the customer IDs to produce an aggregated transaction metric data set; determining, for each aggregated transaction metric in the aggregated transaction metric data set, a precision value; determining, for each aggregated transaction metric in the aggregated transaction metric data set, a suspension propensity importance; determining, for each aggregated transaction metric in the aggregated transaction metric data set, a scoring weight based at least on one of the precision value and the suspension propensity importance; determining, for each customer ID within the plurality of customer IDs, a risk score based at least on the scoring weights applied to corresponding transaction metrics; determining, based at least on the risk score for each customer ID within the plurality of customer IDs, a risk priority; and reporting, for a selected risk priority, at least one customer ID associated with the selected risk priority.

An exemplary computer storage device has computer-executable instructions stored thereon for determining fraud risk scores, which, on execution by a computer, cause the computer to perform operations comprising: receiving transaction metrics indexed with one of a plurality of customer IDs, wherein the transaction metrics comprise refund transaction data and cancellation transaction data; aggregating the transaction metrics across the customer IDs to produce an aggregated transaction metric data set; removing, from the aggregated transaction metric data set, at least a portion of aggregated transaction metrics having a correlation exceeding a correlation threshold; determining, for each aggregated transaction metric in the aggregated transaction metric data set, a precision value; training an ML model on transaction feedback, wherein training the ML model on transaction feedback comprises: splitting data into training, validation, and test data sets; and training the ML model to maximize a parameter of a precision-recall data set; determining, for each aggregated transaction metric in the aggregated transaction metric data set and using the ML model, a suspension propensity importance; determining, for each aggregated transaction metric in the aggregated transaction metric data set, a scoring weight based at least on one of the precision value and the suspension propensity importance; determining, for each customer ID within the plurality of customer IDs, a risk score based at least on the scoring weights applied to corresponding transaction metrics; determining, based at least on the risk score for each customer ID within the plurality of customer IDs, a risk priority, wherein determining the risk priority comprises assigning each customer ID to one of a predetermined set of risk categories having no more than five categories; reporting, for a selected risk priority, at least one customer ID associated with the selected risk priority; and reporting reasons for the selected risk priority associated with the reported customer ID.

Alternatively, or in addition to the other examples described herein, examples include any combination of the following:
- the transaction metrics comprise refund transaction data and cancellation transaction data;
- the instructions are further operative to remove, from the aggregated transaction metric data set, at least a portion of aggregated transaction metrics having a correlation exceeding a correlation threshold;
- removing, from the aggregated transaction metric data set, at least a portion of aggregated transaction metrics having a correlation exceeding a correlation threshold;
- the instructions are further operative to train an ML model on transaction feedback; and wherein determining the scoring weight comprises determining, using the ML model, the scoring weight;
- training an ML model on transaction feedback; and wherein determining the scoring weight comprises determining, using the ML model, the scoring weight;
- training the ML model on transaction feedback comprises splitting data into training, validation, and test data sets; and training the ML model to maximize a parameter of a precision-recall data set;
- determining the risk priority comprises assigning each customer ID to one of a predetermined set of risk categories;
- the predetermined set of risk categories has no more than five categories;
- reporting at least one customer ID associated with the selected risk priority further comprises reporting reasons for the selected risk priority associated with the reported customer ID;
- the instructions are further operative to limit, based at least on a risk priority associated with a selected customer IDs, a transaction;
- the operations further comprise limiting, based at least on a risk priority associated with a selected customer IDs, a transaction; and
- limiting, based at least on a risk priority associated with a selected customer IDs, a transaction.

The order of execution or performance of the operations in examples of the disclosure illustrated and described herein may not be essential, and thus may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense. While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A system for determining fraud risk scores, the system comprising:
   a processor; and
   a computer-readable medium storing instructions that are operative when executed by the processor to:
   generate a plurality of customer IDs, each customer ID associated with a customer profile, wherein each customer ID is a randomized, unique identifier associated with transaction metrics of the associated customer profile;
   receive the transaction metrics indexed with one of the plurality of customer IDs from a network including at least one of an online sales site or an in-store terminal, the transaction metrics including sales data and refund data;
   aggregate the transaction metrics across the plurality of customer IDs to produce an aggregated transaction metric data set;
   compare each aggregated transaction metric of the aggregated transaction metric data set to historical data from the plurality of customer IDs;
   identify an outlying transaction in the aggregated transaction metric;
   determine, responsive to the comparison, a precision value for each aggregated transaction metric in the aggregated transaction metric data set, wherein the precision value is an inverse of a variance for the each aggregated transaction metric across the plurality of customer IDs;
   determine, for each aggregated transaction metric in the aggregated transaction metric data set, a suspension propensity importance;
   calculate, for each aggregated transaction metric in the aggregated transaction metric data set, a scoring weight using a trained machine learning (ML) model based at least on one of the precision value, the identified outlying transaction, and the suspension propensity importance, wherein the trained ML model is trained on transaction feedback and includes splitting data into training, validation, and test data sets and training the ML model to maximize a parameter of a precision-recall data set;

calculate, for each customer ID within the plurality of customer IDs, a risk score based at least on the scoring weight applied to corresponding transaction metrics;

determine, based at least on the risk score for each customer ID within the plurality of customer IDs, a risk priority;

report, for a selected risk priority, at least one customer ID associated with the selected risk priority to a graphical user interface (GUI) for investigation; and deny a refund to the at least one customer ID responsive to the reporting of the at least one customer ID.

2. The system of claim 1 wherein the transaction metrics comprise refund transaction data and cancellation transaction data.

3. The system of claim 1 wherein the instructions are further operative to:
remove, from the aggregated transaction metric data set, at least a portion of aggregated transaction metrics having a correlation exceeding a correlation threshold.

4. The system of claim 1 wherein determining the risk priority comprises assigning each customer ID to one of a predetermined set of risk categories.

5. The system of claim 4 wherein the predetermined set of risk categories has no more than five categories.

6. The system of claim 1 wherein reporting at least one customer ID associated with the selected risk priority further comprises reporting reasons for the selected risk priority associated with the reported at least one customer ID.

7. The system of claim 1 wherein the instructions are further operative to:
limit, based at least on a risk priority associated with a selected customer ID of the plurality of customer IDs, a transaction.

8. A method of determining fraud risk scores, the method comprising:
generating a plurality of customer IDs, each customer ID associated with a customer profile, wherein each customer ID is a randomized, unique identifier associated with transaction metrics of the associated customer profile;

receiving the transaction metrics indexed with one of the plurality of customer IDs from a network including at least one of an online sales site or an in-store terminal, the transaction metrics including sales data and refund data;

aggregating the transaction metrics across the plurality of customer IDs to produce an aggregated transaction metric data set;

comparing each aggregated transaction metric of the aggregated transaction metric data set to historical data from the plurality of customer IDs;

identifying an outlying transaction in the aggregated transaction metric;

determining, responsive to the comparison, a precision value for each aggregated transaction metric in the aggregated transaction metric data set, wherein the precision value is an inverse of a variance for the each aggregated transaction metric across the plurality of customer IDs;

determining, for each aggregated transaction metric in the aggregated transaction metric data set, a suspension propensity importance;

calculating, for each aggregated transaction metric in the aggregated transaction metric data set, a scoring weight using a trained machine learning (ML) model based at least on one of the precision value, the identified outlying transaction, and the suspension propensity importance, wherein the trained ML model is trained on transaction feedback and includes splitting data into training, validation, and test data sets and training the ML model to maximize a parameter of a precision-recall data set;

calculating, for each customer ID within the plurality of customer IDs, a risk score based at least on the scoring weight applied to corresponding transaction metrics;

determining, based at least on the risk score for each customer ID within the plurality of customer IDs, a risk priority;

reporting, for a selected risk priority, at least one customer ID associated with the selected risk priority to a graphical user interface (GUI) for investigation; and denying a refund to the at least one customer ID responsive to the reporting of the at least one customer ID.

9. The method of claim 8 wherein:
the transaction metrics comprise refund transaction data and cancellation transaction data, and
responsive to the variance decreasing, the precision value increases, and
wherein the method further comprises flagging a transaction based on the transaction metric for the transaction being an outlier from the decreased variance.

10. The method of claim 8 further comprising:
removing, from the aggregated transaction metric data set, at least a portion of aggregated transaction metrics having a correlation exceeding a correlation threshold.

11. The method of claim 8 wherein:
determining the risk priority comprises assigning each customer ID to one of a predetermined set of risk categories, and
the method further comprises:
associating the at least one customer ID with the outlying transaction, and
increasing the determined risk priority for the at least one customer ID responsive to the association of the at least one customer ID with the outlying transaction.

12. The method of claim 11 wherein:
the predetermined set of risk categories has no more than five categories, and
the suspension propensity importance is determined based on whether a particular activity previously resulted in suspension of transactions due to fraud.

13. The method of claim 8 wherein reporting at least one customer ID associated with the selected risk priority further comprises reporting reasons for the selected risk priority associated with the reported at least one customer ID.

14. The method of claim 8 further comprising:
limiting, based at least on a risk priority associated with a selected customer ID of the plurality of customer IDs, a transaction.

15. One or more computer storage devices having computer-executable instructions stored thereon for determining fraud risk scores, which, on execution by a computer, cause the computer to perform operations comprising:
generating a plurality of customer IDs, each customer ID associated with a customer profile, wherein each customer ID is a randomized, unique identifier associated with transaction metrics of the associated customer profile;

receiving the transaction metrics indexed with one of the plurality of customer IDs from a network including at least one of an online sales site or an in-store terminal, wherein the transaction metrics comprise sales transaction data, refund transaction data, and cancellation transaction data;

aggregating the transaction metrics across the plurality of customer IDs to produce an aggregated transaction metric data set;

comparing each aggregated transaction metric of the aggregated transaction metric data set to historical data from the plurality of customer IDs;

identifying an outlying transaction in the aggregated transaction metric;

removing, from the aggregated transaction metric data set, at least a portion of aggregated transaction metrics having a correlation exceeding a correlation threshold;

determining, responsive to the comparison, a precision value for each aggregated transaction metric in the aggregated transaction metric data set, wherein the precision value is an inverse of a variance for the each aggregated transaction metric across the plurality of customer IDs;

training a machine learning (ML) model on transaction feedback, wherein training the ML model on transaction feedback comprises:

splitting data into training, validation, and test data sets; and training the ML model to maximize a parameter of a precision-recall data set;

calculating, for each aggregated transaction metric in the aggregated transaction metric data set and using the ML model, a suspension propensity importance;

calculating, for each aggregated transaction metric in the aggregated transaction metric data set, a scoring weight based at least on one of the precision value, the identified outlying transaction, and the suspension propensity importance;

determining, for each customer ID within the plurality of customer IDs, a risk score based at least on the scoring weight applied to corresponding transaction metrics;

determining, based at least on the risk score for each customer ID within the plurality of customer IDs, a risk priority, wherein determining the risk priority comprises assigning each customer ID to one of a predetermined set of risk categories having no more than five categories;

reporting, for a selected risk priority, at least one customer ID associated with the selected risk priority to a graphical user interface (GUI) for investigation;

reporting reasons for the selected risk priority associated with the reported at least one customer ID to the GUI; and denying a refund to the at least one customer ID responsive to the reporting of the at least one customer ID.

16. The one ore more computer storage devices of claim 15 wherein the operation further comprise:

limiting, based at least on a risk priority associated with a selected customer ID of the plurality of customer IDs, a transaction.

* * * * *